Sept. 16, 1941.   C. O. GRIFFITH   2,256,389
VEHICLE DROP RUNNING BOARD
Filed May 29, 1939

INVENTOR.
Charles O. Griffith
BY A. B. Bowman
ATTORNEY.

Patented Sept. 16, 1941

2,256,389

UNITED STATES PATENT OFFICE 2,256,389

VEHICLE DROP RUNNING BOARD

Charles O. Griffith, San Diego, Calif.

Application May 29, 1939, Serial No. 276,307

3 Claims. (Cl. 280—166)

My invention relates to a vehicle drop running board, more particularly for use on automobiles, and the objects of my invention are:

First, to provide a vehicle drop running board of this class, for use in dropping unauthorized persons from the sides of vehicles;

Second, to provide a vehicle drop running board of this class which will tilt downwardly at the will of the operator of the vehicle to which it is attached;

Third, to provide a vehicle drop running board of this class which may readily replace the conventional running board of various vehicles; and Fourth, to provide a drop running board of this class which is very simple and economical of construction, efficient in its action and which will not readily deteriorate or get out of order.

Figure 1:
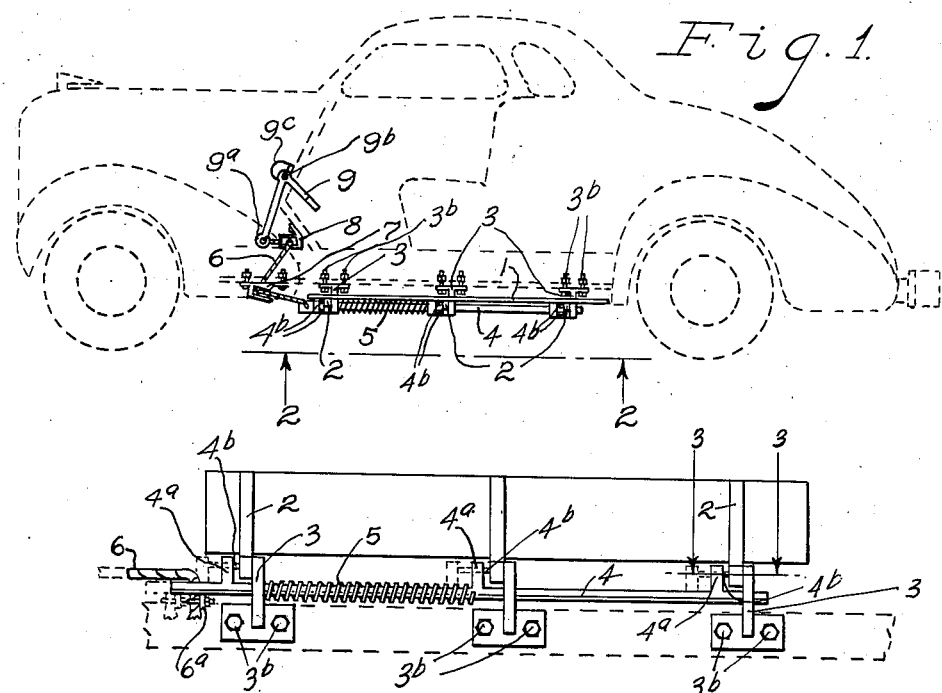
Figure 2:
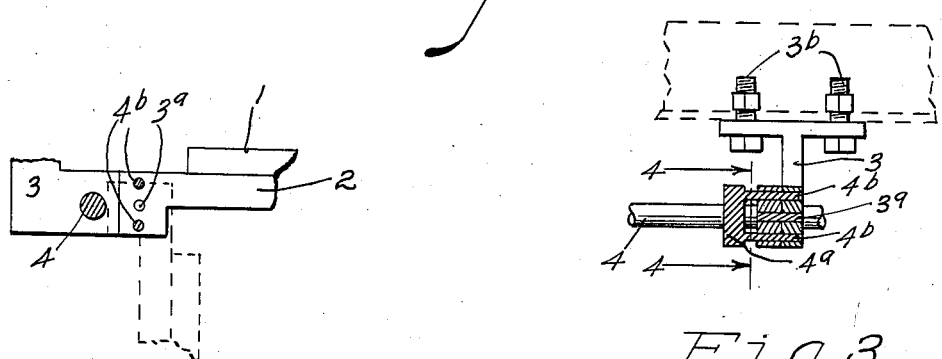
Figures 3, 4:

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a diagrammatic view of an automobile, showing my vehicle drop running board attached thereto; Fig. 2 is a fragmentary bottom plan view taken from the line 2—2 of Fig. 1 showing by dash lines a varied position of the tripping latch member; Fig. 3 is a fragmentary sectional view taken from the line 3—3 of Fig. 2; Fig. 4 is a fragmentary sectional view taken from the line 4—4 of Fig. 3 showing by dash lines and arrows a vertical tilted position of the running board.

Similar characters of reference refer to similar parts and portions throughout the several views of the drawing:

The running board 1, the running board supports 2 and 3, tripping latch member 4, tripping latch member spring 5, tripping latch member cable 6, pulleys 7 and 8 and the foot control lever 9 constitutes the principal parts and portions of my vehicle drop running board.

The running board 1 is substantially rectangular in shape and secured to its lower surface are running board supporting brackets 2. These supporting brackets 2 are each pivotally mounted at one end to one of the running board supporting brackets 3 by means of the pins 3a as shown best in Figs. 3 and 4 of the drawing. The running board supporting brackets 3 are secured to the vehicle frame by means of the bolts 3b.

The tripping latch member 4 is journalled in each of the running board supporting brackets 3 and is provided with extending arm portions 4a. Secured to each of these portions 4a are two extending pins 4b which are adapted to extend into holes in the ends of the running board supporting brackets 2 and 3 for the purpose of latching the running board 1 in a horizontal position, as shown best in Figs. 3 and 4 of the drawing. The tripping latch member spring 5 is mounted longitudinally on the tripping latch member 4. One end of this spring 5 engages the running board supporting bracket 3 and presses backwardly at its other end against the extending arm portion 4a of the tripping latch member 4, as shown best in Figs. 1 and 2 of the drawing. The compression of the said spring 5 holds the pins 4b of the tripping latch 4 securely in holes in the running board supporting brackets 2 and 3. The cable 6 is secured at its one end in the end of the tripping latch member 4 by means of the U bolt 6a and extends over the pulleys 7 and 8, and is secured to the extending end 9a of the foot control lever 9. The pulley 7 is mounted on the frame of the vehicle and is adapted to support and guide the cable 6. The pulley 8 is mounted on the floor board of the vehicle and is adapted to support and guide the cable 6 as shown best in Fig. 1. The foot control lever 9 is pivotally mounted on the front compartment panel by means of the pin 9b and the bracket 9c.

The operation of my vehicle drop running board is substantially as follows:

Assuming that the running board 1 is latched in a horizontal position and an unauthorized person is standing on it while the vehicle is in motion; in order to drop this person from the side of the vehicle, the operator of the vehicle presses on the foot control lever 9 with his foot. The extending end 9a of this lever 9 would shift forwardly pulling the cable 6 over the pulleys 7 and 8. The tripping latch member 4, in connection with the cable 6, would shift forwardly, releasing the pins 4b in connection therewith from the running board supporting brackets 2 and 3, permitting the running board 1 to tilt downwardly, as shown by dash lines in Fig. 4. The unauthorized person would then fall from the side of the car and would be left behind. The running board 1 would then be manually replaced and latched to its horizontal position for future use and emergencies.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a vehicle drop running board of the class described, the combination of a plurality of brackets each provided with perforations forming latch portions and secured to the frame of the vehicle, second brackets provided with perforations forming latch portions and each pivotally connected to one of said first mentioned brackets intermediate said latch portions and extending therefrom, a running board secured to said second brackets and separate dowel latch means reciprocally mounted on said first mentioned brackets and cooperatively connected with the perforate latch portions of said first and second mentioned brackets.

2. In a vehicle drop running board of the class described, the combination of a plurality of brackets each provided with perforations forming latch portions and secured to the frame of the vehicle, second brackets provided with perforations forming latch portions and each pivotally connected to one of said first mentioned brackets intermediate said latch portions and extending therefrom, a running board secured to said second brackets and separate dowel latch means reciprocally mounted on said first mentioned brackets and cooperatively connected with the perforate latch portions of said first and second mentioned brackets, and spring means in connection with said separate dowel latch means for holding said latch means in latched position.

3. In a vehicle drop running board of the class described, the combination of a plurality of brackets each provided with perforations forming latch portions and secured to the frame of the vehicle, second brackets provided with perforations forming latch portions and each pivotally connected to one of said first mentioned brackets intermediate said latch portions and extending therefrom, a running board secured to said second brackets and separate dowel latch means reciprocally mounted on said first mentioned brackets and cooperatively connected with the perforate latch portions of said first and second mentioned brackets, spring means in connection with said separate dowel latch means for holding said latch means in latched position, and foot operating means including a cable and pulleys for shifting said separate dowel latch means out of engagement with said brackets.

CHARLES O. GRIFFITH.